US006126187A

United States Patent [19]

Vassilli

[11] Patent Number: 6,126,187

[45] **Date of Patent: *Oct. 3, 2000**

[54] WHEEL-CHAIR FOR DISABLED PEOPLE ADAPTED TO BE REDUCED AND OBTAINED BY ASSEMBLING SINGLE PARTS, SOME OF THEM BEING MODULAR, WITHOUT HEAT WELDING

[75] Inventor: Berto Vassilli, Saonara, Italy

[73] Assignee: Vassilli S.r.l., Saonara, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/844,972

[22] Filed: Apr. 23, 1997

[30] Foreign Application Priority Data

May 17, 1996 [IT] Italy ................................ PD96A0124

[51] Int. Cl.[7] ....................................................... B62M 1/14
[52] U.S. Cl. ..................................... 280/250.1; 280/304.1
[58] Field of Search ............................. 280/250.1, 304.1, 280/649; 297/423.25, 423.37

[56] References Cited

U.S. PATENT DOCUMENTS

| | | | |
|---|---|---|---|
| 3,185,527 | 5/1965 | Pivacek | 297/423.37 |
| 3,453,027 | 7/1969 | Pivacek | 297/423.37 |
| 3,854,774 | 12/1974 | Limpach | 297/423.37 |
| 4,120,532 | 10/1978 | Clanan | 297/423.37 |
| 4,176,879 | 12/1979 | Rodaway | 297/423.37 |
| 4,676,519 | 6/1987 | Meier | 280/649 |
| 4,805,931 | 2/1989 | Slasor | 280/250.1 |
| 5,186,480 | 2/1993 | Morgan et al. | 280/250.1 |
| 5,333,887 | 8/1994 | Luther | 280/250.1 |

FOREIGN PATENT DOCUMENTS

| | | | |
|---|---|---|---|
| 94/11236 | 5/1994 | WIPO | 280/250.1 |

*Primary Examiner*—J. J. Swann
*Assistant Examiner*—Michael Cuff
*Attorney, Agent, or Firm*—Renner, Otto, Boisselle & Sklar, LLP

[57] ABSTRACT

A wheel-chair for disabled people adapted to be reduced by joining its side frames. The wheel-chair is obtained by assembling single parts without requiring any heat welding intervention, by using screws or rivets. The basic structure of the wheel-chair is realized by means of modular members; by adequately choosing comaplementary parts, wheel-chairs suitable for different applications can be obtained.

9 Claims, 6 Drawing Sheets

WHEEL-CHAIR FOR DISABLED PEOPLE ADAPTED TO BE REDUCED AND OBTAINED BY ASSEMBLING SINGLE PARTS, SOME OF THEM BEING MODULAR, WITHOUT HEAT WELDING

BACKGROUND OF THE INVENTION

The present invention deals with wheel-chairs for disabled people, and in particular with a wheel-chair for disabled people adapted to be reduced and obtained by assembling single parts, some of them being modular, without requiring heat welding.

The subject dealing with wheel-chairs for disabled people is well known to skilled people in the field and is particularly taken care of by people interested in purchasing the item. Manufacturers have marketed several types of wheel-chairs, having different performances, to satisfy the complex needs of disabled people that have to use them.

For all kinds of solutions two aspects are of paramount importance: cost and performances.

It is obvious that all wheel-chairs must have a seat, a back and wheels. There could be upon request: handles to push and drive the wheel-chair by the person assisting the disabled; side boards with or without armrest; foot-resting boards; etc.

BRIEF SUMMARY OF THE INVENTION

Purpose of the present invention is manufacturing at a competitive price wheel-chairs equipped with parts facilitating their use.

This purpose is obtained by revolutioning the currently used system. The wheel-chair is not obtained any more by welding a certain number of members one to the other, but assembling without welding single component parts of the prefabricated type. These component parts too are obtained without welding. This is very important because thereby the different component parts can also be non-metallic. Complementary parts being required are assembled to the basic skeleton, obtained by assembling modular parts without welding. By adequately choosing said complementary parts, wheel-chairs are obtained that can provide different performance or comfort.

Assembly of the different parts is carried out with screws or rivets; but it could also be carried out by glueing, taking into account that said parts to be assembled can also be non-metallic. The chance of putting together single parts to be chosen among a plurality thereof depending on market needs generates savings both when manufacturing the parts and when storing them.

BRIEF DESCRIPTION OF THE SEVERAL VIEWS OF THE DRAWING

The above and other purposes and advantages of the present invention will be better understood by reference to the following drawings, in which.

DETAILED DESCRIPTION OF THE INVENTION

Figure 1:
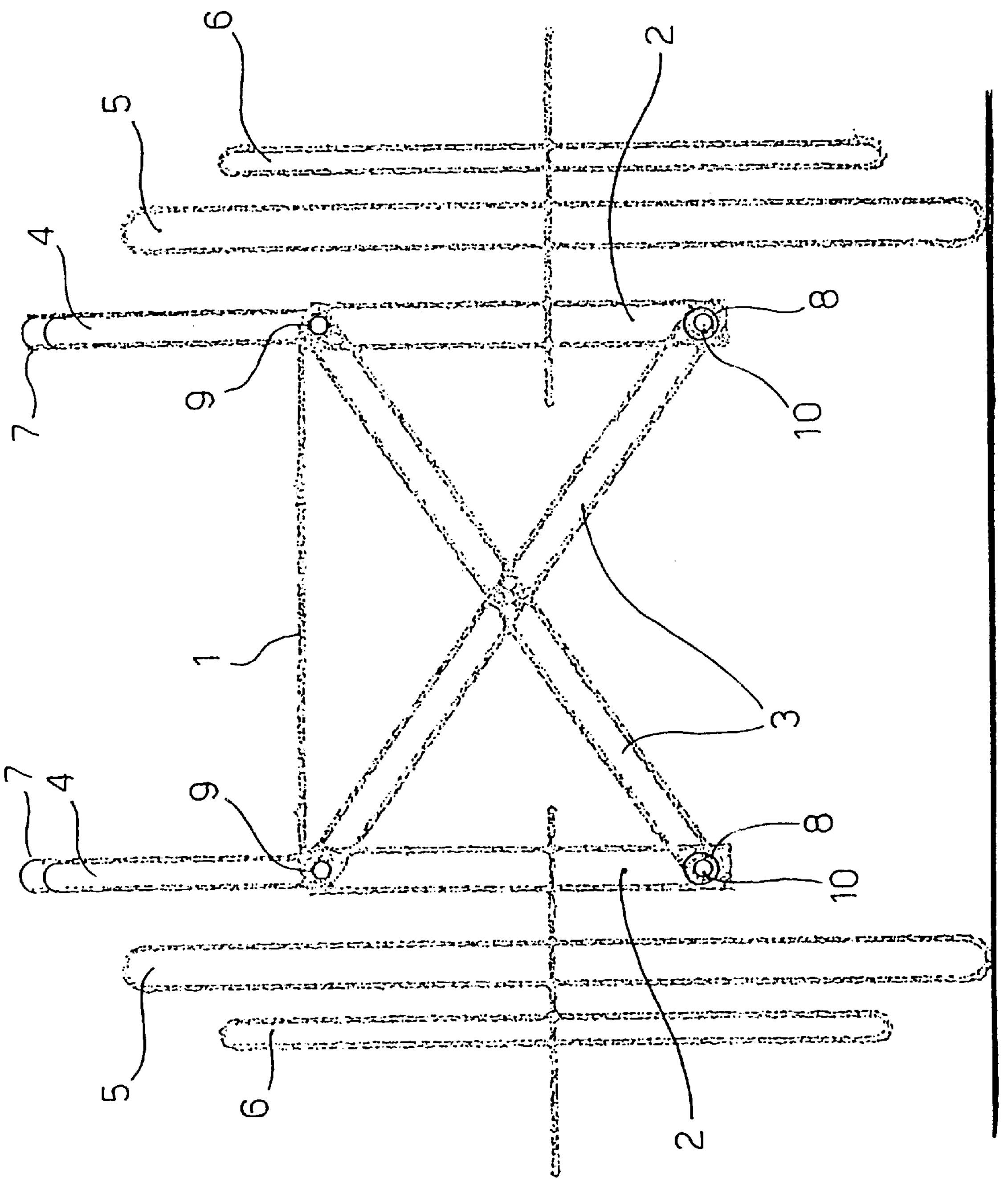
FIG. 1 schematically represents and summarizes a wheel-chair for disabled people adapted to be reduced.

With reference to FIG. 1, numeral 1 denotes a seat made of cloth with two side frames 2; 3 denotes the cross rods that keep the side frames 2 parallel and defines the maximum opening thereof; 4 denotes the stakes to hold the sheet composing the hack and whose extension over the back creates handles 7 to make third parties drive the wheel-chair; 5 denotes the wheels; 6 the rings integral with the wheels for possible handling of the wheel-chair by the user; 8 denotes the lower side frame cross members; 10 denotes the iron girders applied to lower ends of the rods 3 and 9 denotes the cross members applied to upper ends of the rods 3.

Figure 2:
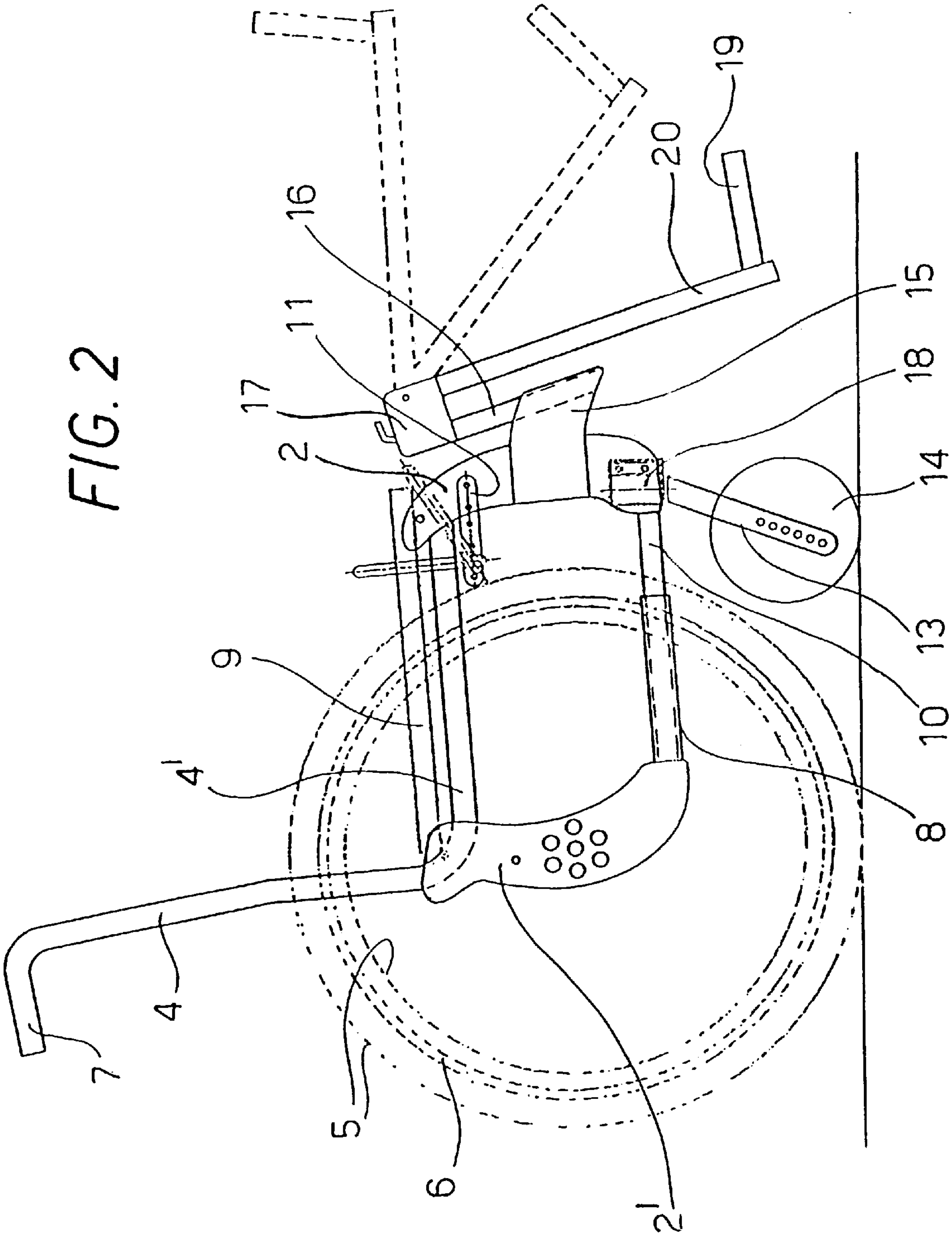
FIG. 2 schematically shows a wheel-chair side frame according to the invention.

With reference to FIG. 2, cross rods 3 have not been included in the drawing for reasons of clarity.

The basic structure is composed of a quadrilateral formed of boxed risers 2' and 2 and cylinder iron girders 4' and 10. Numeral 8 denotes the tubular cross member integral with the lower ends of the cross rods 3 suitable to rotate around the support iron girders 10 to which it is coupled; 9 denotes the cross member integral with the upper ends of the cross rods 3 and on which the seat made of fabric is applied; 4 denotes the stake operating as support for the back made of fabric and that extends upwards to realize the driving handle 7; 5 denotes the wheel integral with the driving ring 6. The support 18 is secured into the lower part of the riser 2 for the swingable fork 13 of the small wheel 14 and in the upper part of said riser the braking device 11 is secured to brake the wheel 5. The riser 2 is equipped with a shelf 15 supporting a rod 16 that can be blocked in the desired position. Coupling between shelf 15 and riser 2 is realized in such a way as to allow an easy assembly and as easy a separation. The bracket 17 is integral with the rod 16. The rod 20 is hinged onto the bracket 17 and supports the foot-rest 19.

Figure 3:
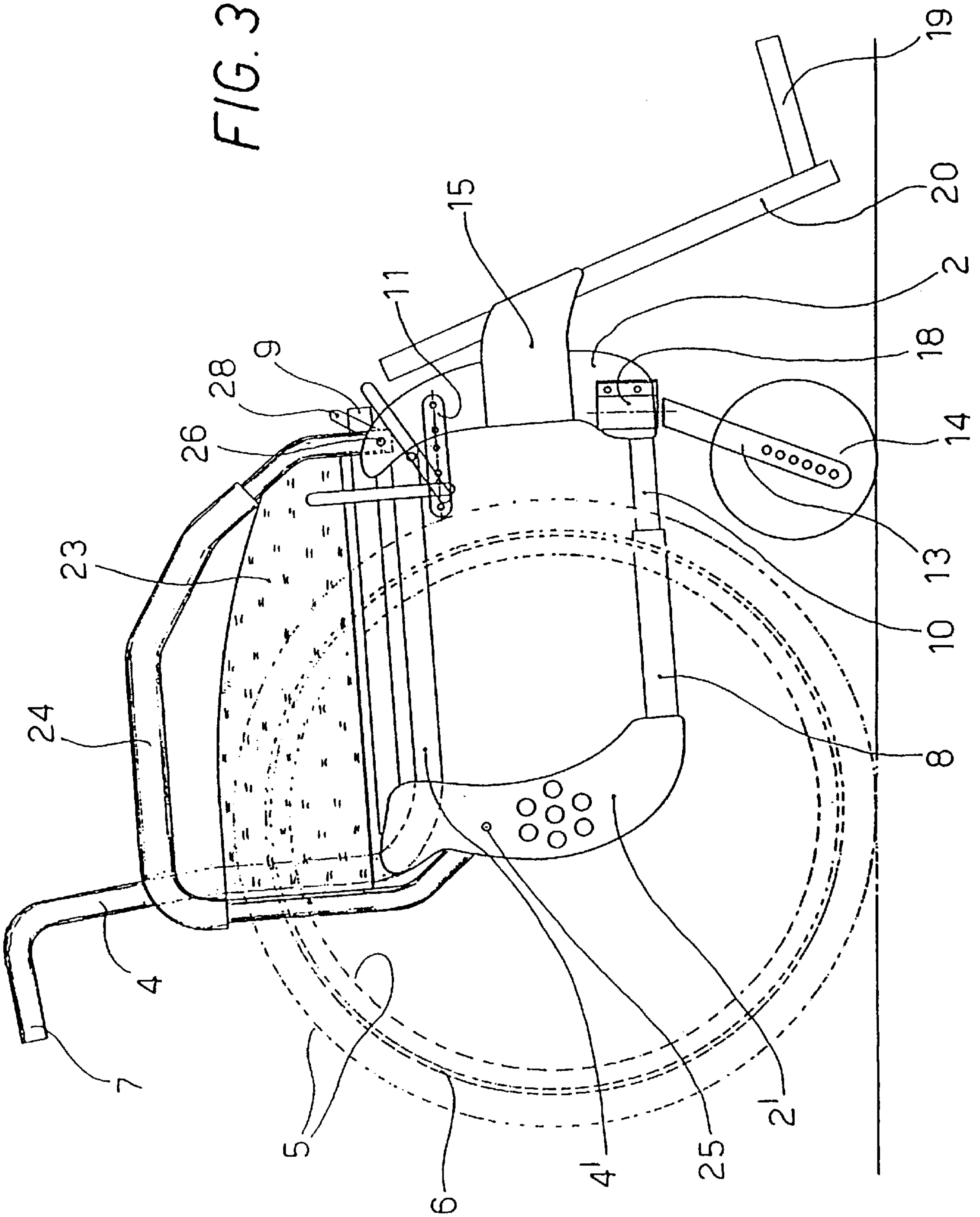
FIG. 3 is a view of the side frame shown in FIG. 2.

With reference to FIG. 3, the equipment related to foot-rest has been modified and the arm-rest 24 appears equipped with a wall 23. The above-said arm-rest 24 with related wall 23, once released from the closure applied in 26, can be lifted backwards by rotating around the hinging point 25. Numerals 2' and 2 denote risers that, with the iron girders 10 and 4', compose the basic structure; 5 denotes the wheel; 6 denotes the driving ring integral with the wheel 5; 8 and 9 denote tubular cross members applied to the ends of cross rods 3; 18 denotes the support secured to the riser 2 for the swingable fork 13 of the small wheel 14; 15 denotes the shelf secured to the riser 2 supporting the rod 20 supporting in turn the foot-rest 10; 11 denotes the braking apparatus for the wheel 5.

Figure 4:
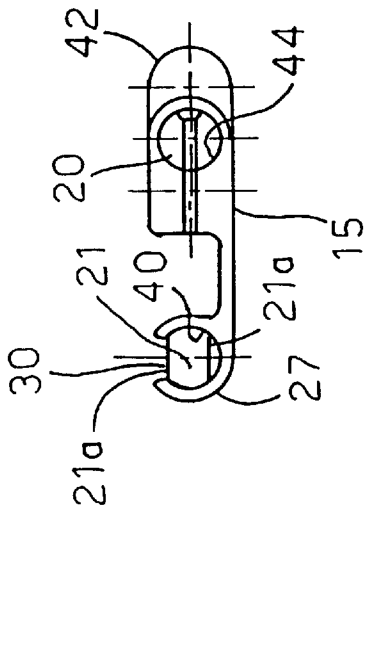
FIG. 4 is a view of a shelf to be used with the present invention.

FIG. 4 shows how the shelf 15 is coupled with the riser 2. The riser 2 is coupled to the seat 27 for the shelf 15 at a cylindrical riser having two opposed facets 21*a* defining a smaller width and a larger width of said cylinder riser. The seat 27 has a opening or longitudinal aperture 30 that can be aligned with the smaller width of the riser 2 between the facets for insertion of the riser into the seat for coupling the seat to the riser. Once having inserted the small riser 21 into the seat. 27, by rotating the shelf 15 the coupling becomes a constraint. Numeral 20 denotes the rod supporting the foot-rest. Accordingly, coupling/uncoupling of the foot-rest boards with respect to the wheel-chair can be effected solely by rotating the shelves inwards/outwards without the need of any vertical movement of the shelves.

Figure 7:
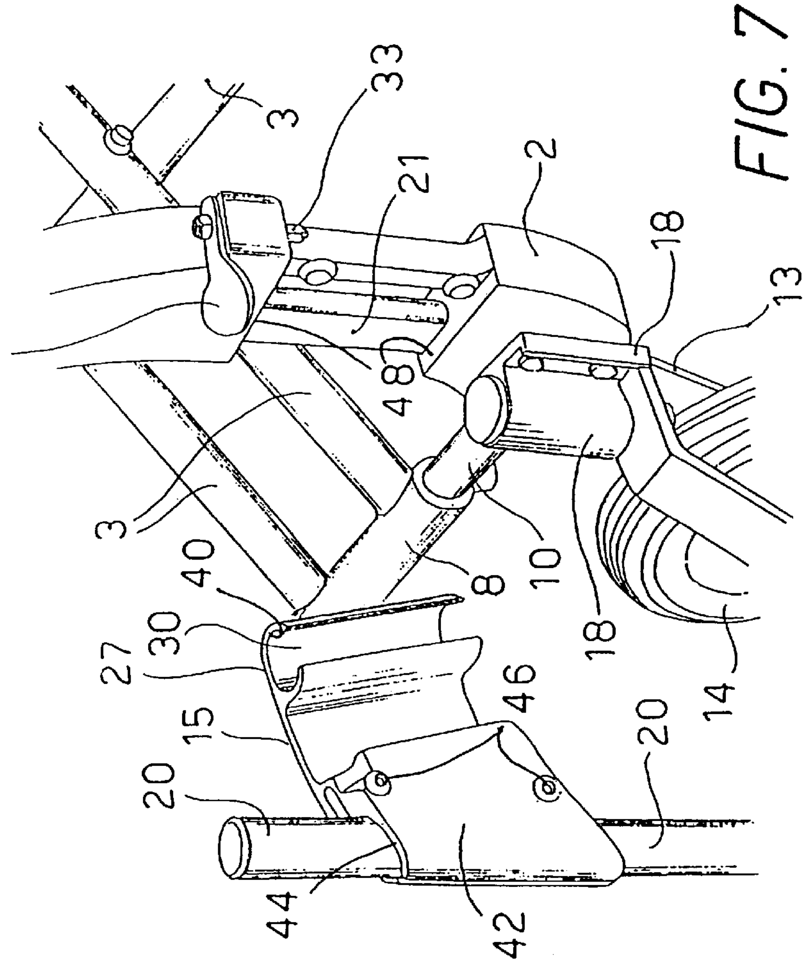
FIG. 7 shows the shelf separated from the riser.

Moreover, and more particularly, as described above and as shown in FIGS. 4 and 5, the post 21 (elsewhere referred to herein as the cylinder riser 21) is cylindrical except for the pair of opposed flat faces 21*a* (elsewhere referred to herein as facets 21*a*), which flat faces are parallel and define a width less than the diameter of the cylindrical post 21. The bracket 15 (elsewhere referred to herein as the shelf 15) includes the holder portion 27 (elsewhere referred to herein as the seat 27) and a clamping portion 42. As shown in FIG. 7, the holder portion 27 has a cylindrical channel 40 which opens to a side of the holder portion 27 via the slot 30 (elsewhere referred to herein as the longitudinal aperture 30). The slot 30 is narrower than the diameter of the cylindrical post 21 and wider than the width of the post 21, i.e., the width defined between the opposed flat faces 21*a*. In addition, the diameter of the cylindrical post 21 corresponds to the diameter of the cylindrical channel 40 as seen in FIG. 4.

Because the width of the slot 30 is wider than the width of the post 21, the post 21 may be inserted through the slot and into the cylindrical channel 40 when the width portion (narrow dimension) of the post 21 is aligned with the slot 30. After the post is inserted into the channel, the holder portion can be rotated to its position shown in FIGS. 4 and 5, thereby locking the post in the channel.

Figure 5:
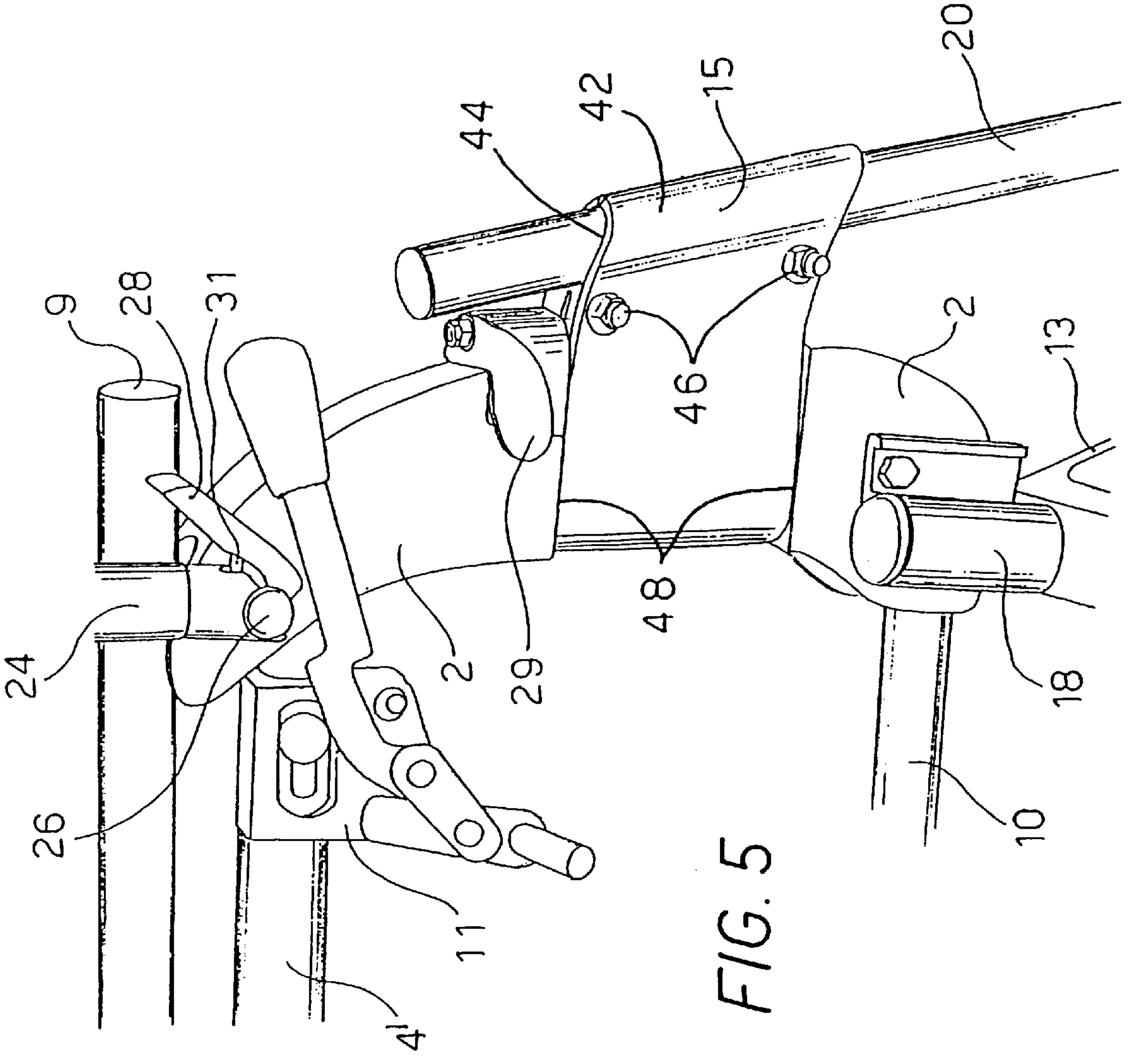
FIG. 5 shows a coupling condition between the shelf in FIG. 4 and a riser.
Figure 6:
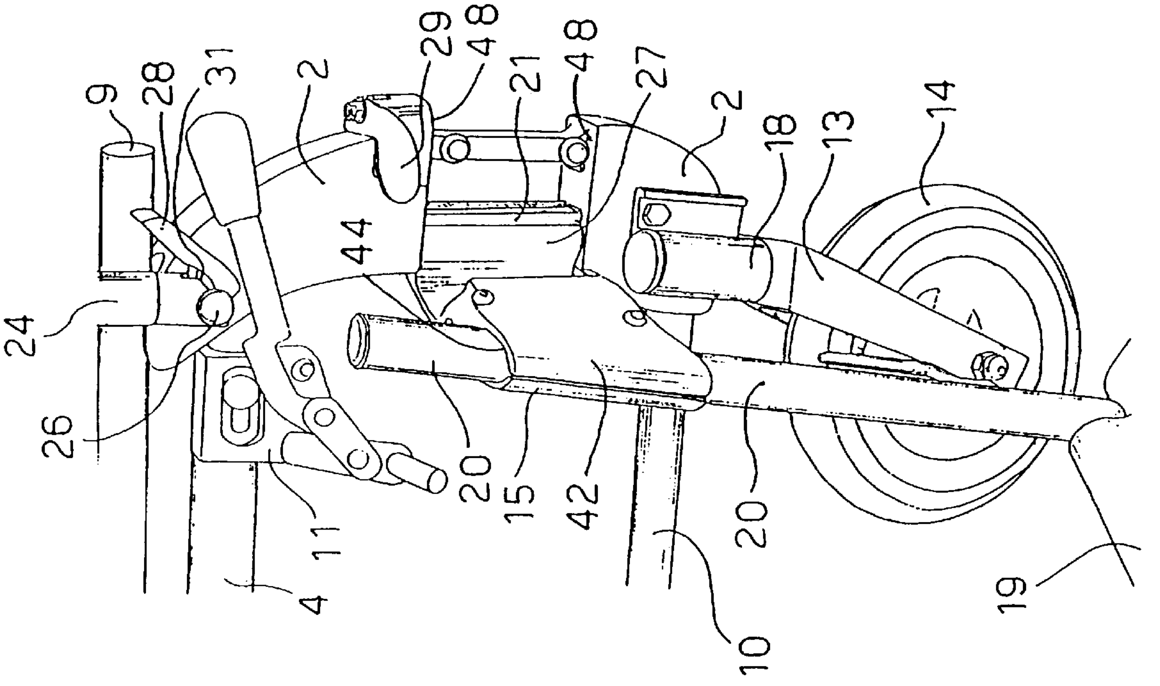
FIG. 6 shows another coupling condition between shelf and riser.

As seen in FIGS. 5–7, the post 21 extends between upper and lower portions of the riser 2, which upper and lower portions have opposed surfaces 48 defining therebetween a space into which the bracket 15 is inserted and rotated to couple the bracket to the riser as above described. When thus coupled as shown in FIG. 5, the top and bottom ends of the bracket 15 abut the opposed surfaces which prevent vertical shifting of the bracket relative to the riser. As will be appreciated, the foregoing construction enables assembly of the bracket 15 to the riser without any vertical movement of the bracket.

The clamping portion 42 includes a channel 44 for slidably receiving therein the rod 20, and fasteners 46 which, when tightened, secure the rod 20 with respect to the bracket 15 and, when loosened, permit the rod 20 to be adjusted upward or downward within the channel.

FIG. 5 show in particular the coupling between shelf 15 and riser 2. In this view, the shelf is blocked by a stake 33 connected to the lever 29. To release it, it is necessary to lift the lever 29 and rotate the shelf 15 outwards. Numerals 4' and 10 denote the iron girders that with the risers 2' and 2 compose the basic structure; 9 denote the cross member located on the upper end of the cross rods 3; 24 denotes the lower end part of the arm-rest that is blocked by a bolt 28–31 on the stake 26; 11 denotes the braking apparatus for the wheel; 18 denotes the support, secured to the riser 2, for the swingable fork 13 of the small wheel 14.

FIG. 6 shows the shelf 15 rotated outwards with respect to the riser 2. The opening 30 for the seat 27 is placed next to the lower width of the small faceted riser 21, ready to be disengaged. An identical position of the opening 30 of the shelf 27 with respect to the small riser 21 occurs when assembling the shelves on the riser 2. Insertion and removal of the shelf on the riser 2 are, in fact, carried out with the same methods. Numeral 20 denotes tile rod held by the shelf; 19 denotes the foot-rest secured to the lower end of the rod 20; 18 denotes the support, secured to the riser 2, of the swingable fork 13 of the small wheel 14; 9 denotes the cross member placed on the upper end of the cross rod 3; 24 denotes the lower end part of the arm-rest that is blocked by the bolt 28–31 on the stake 26; 11 denotes the braking apparatus of the wheel.

FIG. 7 shows the shelf 15 separated from the riser 2. The opening 30 of the seat 27 of the shelf 15 and the small riser 21 with one of the two facetings visible, are shown. Numeral 3 denotes the cross roads; 8 denotes the cross member joined to the lower end thereof; 10 denotes the iron girder of the basic structure; 29 denotes the lever operating the stake to block the shelf 15; 20 denotes the rods held by the shelf 15; 18 denotes the support for the swingable fork 13 of the small wheel 14 secured to the riser 2.

Figure 8:
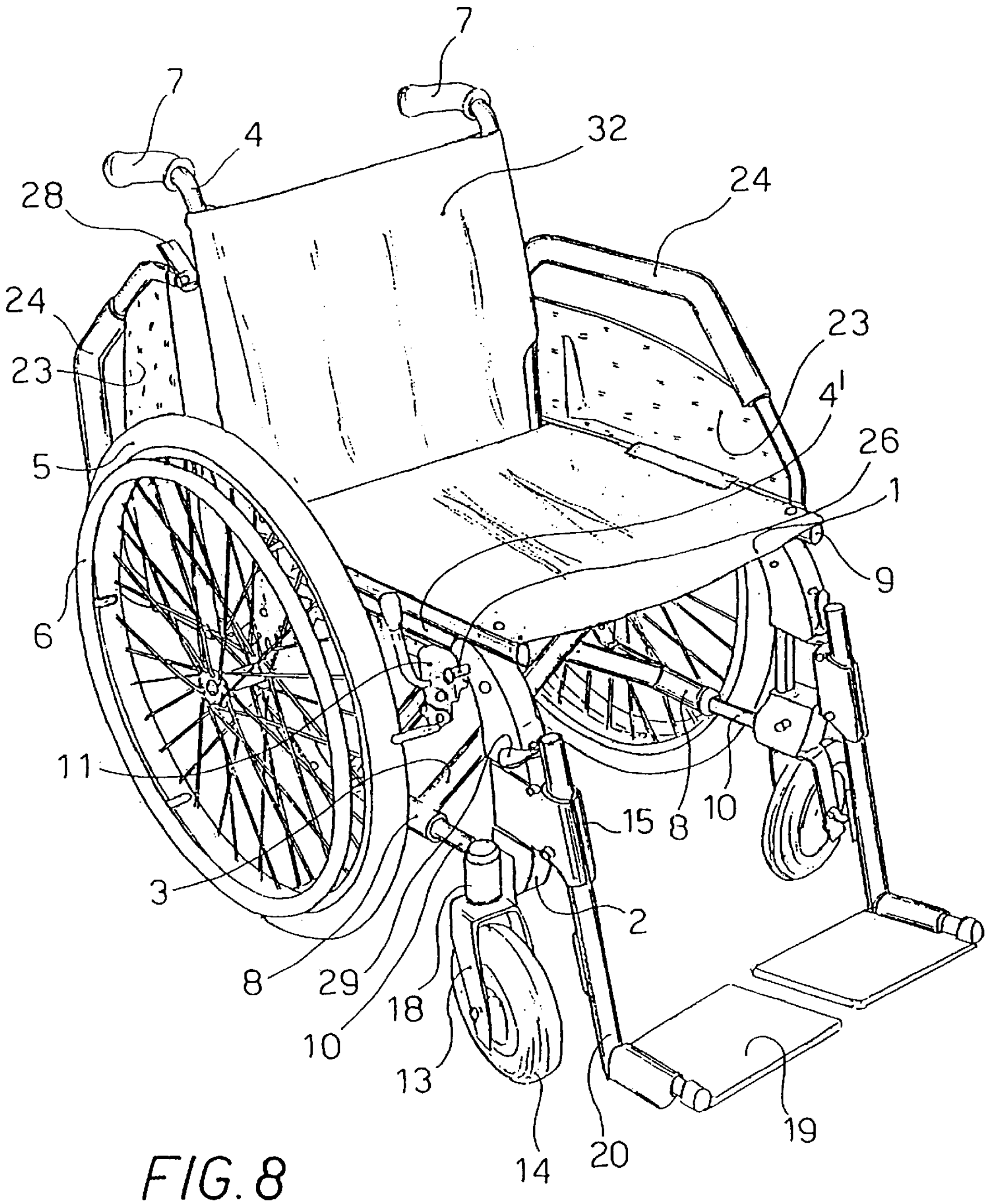
FIG. 8 is a perspective view of the wheel-chair according to the invention.

FIG. 8 is a perspective view of the wheel-chair according to the invention completed with the seat 1 and the back 32 made of fabric and with side boards 23 with armrests 24. Numeral 2 denotes the front riser that, with the iron girders 4' and 10 and the rear riser 2' (not shown), compose the basic structure; 3-8-9 denote the members composing the cross connecting the two side frames. Numeral 5 denotes the wheel and numeral 6 denotes the driving ring integral therewith; 4 denotes the stakes supporting the back 32 and 7 denotes the handles to drive tie wheel-chair by third parties. Numeral 18 denotes the support for the swingable fork 13 of the small wheel 14; 15 denotes the shelf supporting the rod 20 supporting in turn the foot-rest 19; 29 denotes the lever controlling the stake to block the shelf 15 to the riser 2; 26 denotes the stake with which the caliper 31 connected to the lever 28 comes to be engaged; 11 denotes the braking apparatus to block the wheel 5.

From what has been previously stated and shown by the drawings, the features of the invention stand out, that is, it is possible to manufacture a wheel-chair without intervening with heat welding, but instead assembling prefabricated parts, some of which are of the modular type (such as risers (2', 2) and iron girders 10 and 4') using only screws and rivets. The parts composing the wheel-chair are not necessarily metallic ones, being able to be obtained with particular resinous materials, in which case couplings can also be carried out by glueing.

The basic structure is realized in such a way as to be completed without problems with some parts more than others depending on the application provided for the wheel-chair, interchangeability having been provided. Particularly, the novel modular parts include assembly of the shelves 15 supporting the rods for the foot-rest, with the front risers 2.

Although the present invention has been described with reference to preferred embodiments, numerous modifications and rearrangements can be made and still the result will come within the scope of the invention.

What is claimed is:

1. A wheel-chair for disabled people adapted to be reduced and obtained by assembling single parts, some of them being modular, without requiring heat welding, said wheel-chair comprising:

two side frames, each one of said side frames being composed of a structure formed by front and rear risers and upper and lower iron girders joined together through mechanical fastening means;

an articulated cross including rods that are hinged together, said rods being integral with tubular cross members at upper and lower ends thereof;

two brackets supported by said front risers, said brackets supporting rods having lower ends that are equipped with foot rest boards, said brackets being movable and separable from said front risers by rotating said brackets outwards;

two stakes applied to said rear risers to support a back, said stakes being able to project above said back in order to provide handles for a person to drive said wheel-chair;

two side boards with arm-rests;

two pairs of front and rear wheels, said rear wheels being adapted to be equipped with hand rings for a user to drive said wheel-chair; and a device to brake said wheels;

wherein said front risers each comprise upper and lower portions and a cylindrical post extending therebetween, the cylindrical post has a pair of opposed flat faces which are parallel and define therebetween a width less than the diameter of the cylindrical post, and said upper and lower portions have opposed surfaces spaced apart to receive therebetween a corresponding one of said brackets to prevent vertical shifting movement of the bracket when the bracket is assembled to the riser, and wherein said brackets each include a holder portion comprising a channel which opens to a side of the holder portion to define a slot having a width narrower than the diameter of the cylindrical post and wider than the width of the post between the opposed flat faces, and said channel having a diameter corresponding to the diameter of the post, such that said post can be inserted into said channel when the slot is aligned with the width of the post defined between the opposed flat faces and then rotated to lock the bracket to said post, whereby coupling/uncoupling of the foot-rest boards with respect to the wheel-chair is made possible by solely rotating the brackets inwards/outwards without the need of any vertical movement of the brackets.

2. Wheel-chair for disabled people according to claim 1, wherein said mechanical fastening means are screws and/or rivets.

3. Wheel-chair for disabled people according to claim 2, wherein all parts composing said wheel-chair are assembled without any heat welding but only through screws and/or rivets, this being valid both for parts composing said basic structure and for complementary parts.

4. Wheel-chair for disabled people according to claim 2, wherein all parts composing said wheel-chair are assembled without any heat welding but only through screws and/or rivets, this being valid both for parts composing said basic structure and for complementary parts.

5. Wheel-chair for disabled people according to claim 1, wherein said cross is assembled to said side frames by engaging through a swingable coupling its own lower tubular cross members with said lower iron girders of said side frames; and by connecting its own rods with said upper iron girders of said side frames through connection means.

6. Wheel-chair for disabled people according to claim 1, wherein all parts composing said wheel-chair are assembled without any heat welding but only through screws and/or rivets, this being valid both for parts composing said basic structure and for complementary parts.

7. Wheel-chair for disabled people according to claim 1, wherein said boxed risers are provided with a stopper stake connected to a corresponding lever which can be operated manually, said stake being for blocking the brackets in the corresponding front boxed riser after said brackets are rotated inwards.

8. Wheel-chair for disabled people according to claim 1, wherein said side frames and brackets are made of non metallic material.

9. Wheel-chair for disabled people according to claim 8, wherein said side frames and brackets are made of resinous material.

* * * * *